United States Patent [19]

Nazzal et al.

[11] 4,379,740

[45] Apr. 12, 1983

[54] PHOTOASSISTED GENERATION OF HYDROGEN FROM WATER

[75] Inventors: Adel I. Nazzal, San Jose; Ulrich T. Mueller-Westerhoff, Los Gatos, both of Calif.

[73] Assignee: International Business Machines Corporation, Armonk, N.Y.

[21] Appl. No.: 390,085

[22] Filed: Jun. 21, 1982

[51] Int. Cl.$^3$ .................. C25B 1/02; C25B 11/04
[52] U.S. Cl. .................................. 204/129; 204/291
[58] Field of Search ................ 204/129, 157.1 R, 291

[56] References Cited

U.S. PATENT DOCUMENTS

| | | | |
|---|---|---|---|
| 3,992,271 | 11/1976 | Danzig et al. | 204/129 |
| 4,061,555 | 12/1977 | Miyatani et al. | 204/129 |
| 4,144,147 | 3/1979 | Jarrett et al. | 204/291 |
| 4,305,794 | 12/1981 | Davidson et al. | 204/129 |
| 4,325,793 | 4/1982 | Kisch | 204/157.1 R |
| 4,345,982 | 8/1982 | Ikawa et al. | 204/129 |

OTHER PUBLICATIONS

Wrighton, M., "Photochemistry", Chemical Engineering News, Sep. 3, 1979, p. 29-47.
Kung et al., "Semiconducting Oxide Anodes in Photoassisted Elect. of Water", Journal of Applied Physics, vol. 48, No.6, 6/77, pp. 2463-2469.

Primary Examiner—G. L. Kaplan
Assistant Examiner—Nam X. Nguyen
Attorney, Agent, or Firm—Joseph G. Walsh

[57] ABSTRACT

Hydrogen is generated from water containing acid by passing electric current through it, using as the cathode a semiconductor exposed to light and having a transition metal metallocenophane compound attached to the surface of the cathode by means of a polymer.

10 Claims, No Drawings

PHOTOASSISTED GENERATION OF HYDROGEN FROM WATER

DESCRIPTION

1. Technical Field

The present invention is concerned with a process for the photoassisted generation of hydrogen from water. In particular, it is concerned with such a process in which electric current is passed through the water containing an acid and in which the cathode has been specially treated.

2. Background Art

The electrolysis of water to produce hydrogen has been known for a very long time.

The present invention employs metallocenophane compounds of transition metals. Their preparation has been described in the literature. The chemistry of such materials is discussed in the Mar. 1, 1982 edition of "Chemical and Engineering News" beginning on page 23. No art of which we are aware, however, describes the use of polymers to bond these compounds to a cathode.

DISCLOSURE OF THE INVENTION

According to the present invention, hydrogen is generated by the electrolysis of water containing an acid. The cathode is a semiconductor which has been specially treated, as will be described below, and the cathode is exposed to light during the process. The process is particularly important when the light is sun light.

In carrying out the process of the present invention, a polymer is used to bond a transition metal metallocenophane compound to the cathode. The preferred transition metals are cobalt, ruthenium and, particularly, iron. The most preferred compound is [1.1]ferrocenophane, hereafter called FCP.

In the process of the present invention, the cathode must be a semiconductor. The most preferred kind of cathode is one made of p-type silicon. For reasons of economy and availability, this semiconductor is particularly preferred, although others such as InP, for example, may also be used.

Using p-type silicon as the photocathode, one can achieve hydrogen evolution from acids such as boron trifluoride hydrate containing a catalytic amount of a metallocenophane at an underpotential greater than 300 mV. This means that the electrode potential is over 300 mV more positive than that required to evolve hydrogen on a metal electrode such as platinum. In the process hydrogen is evolved in the reaction of the metallocenophane with the acid; the metallocenophane is thereby oxidized to its dication, which is then reduced back to the neutral metallocenophane by electrons generated at the semiconductor surface. In the absence of the metallocenophane, hydrogen cannot be evolved from boron trifluoride hydrate even at very negative potentials and even when irradiated. This is due to the high overpotential of silicon for any hydrogen evolution reaction. The metallocenophane catalyst is essential. According to the process of the present invention, it is preferred that the catalyst is attached to the surface of the semiconductor cathode by means of a polymer. This attachment provides a high concentration of the catalyst at the surface and also has the additional advantage of protecting the semiconductor from passivation and attack by the electrolyte.

By means of the process of the present invention it is possible to obtain hydrogen which may be stored for subsequent use as fuel. During the electrolysis, electrical energy is applied to the system. This amount of energy, however, is less than would be required when a metal electrode such as platinum is used instead of the polymer-modified silicon electrode. The difference is supplied by the light energy which shines upon the cathode. Thus, the present invention represents a process of changing light energy such as sun light into stored chemical energy in the form of hydrogen.

In a preferred embodiment of the present invention, the lithium salt of the carbanion of FCP is reacted with chloromethyl polystyrene to form polymer bound FCP. This polymer bound FCP material is soluble in various organic solvents from which it can be deposited on a semiconductor surface by dipping, spin-coating and the like. A p-type silicon photoconductor modified this way liberates hydrogen from boron trifluoride hydrate at an underpotential of 450 mV, with a platinum electrode as the reference. This underpotential represents the energy gain of converting solar energy into electrical energy whereby the electrical energy is directly converted into energy in the form of hydrogen to be used later as a fuel. The maximum efficiency, measured as net power density gain, is 8.6%. Most important of all is the fact that the lifetime of the modified electrode is greatly extended. Over several days of continuous radiation with a xenon arc lamp, no degradation of the hydrogen generation efficiency has been observed.

Most surprising, the generation of hydrogen is not limited to such strong acids as boron trifluoride hydrate. Even in dilute acids such as hydrochloric and perchloric acid, hydrogen evolution is observed at significant underpotentials (200–250 mV).

When it is said that the metallocenophane compound is attached to the surface of the cathode by means of a polymer, it is meant to include both the situation in which the metalloorganic compound has reacted chemically with a polymer and also the situation in which it is physically dispersed in the polymer. In both cases the polymer serves to attach the organometallic compound to the cathode, thereby enhancing the catalytic activity and also protecting the cathode from degradation during the process.

Preparation of Electrodes

Boron doped p-type single crystal Si wafers of 1 to 10 $\Omega$cm resistivity were used. 5000 angstroms of Al was vapor deposited on the back side to provide for an ohmic contact. The wafer was broken into pieces about 5×7 mm, and copper wire was attached to the back using silver epoxy. Prior to use, the electrode was etched with concentrated hydrofluoric acid for 10 seconds, washed with water and dried. The polymer was applied by dipping the electrode in a dilute solution of the polymer in tetrahydrofuran and allowing it to dry. All electrode surfaces, except for the face and the end of the copper wire, were insulated with wax and poly(perfluroethylene) tubing.

Preparation of Polymer

The polymer was prepared by reacting lithioferrocenophane with poly(chloro methyl styrene) in tetrahydrofuran (THF). The polymer was purified by repeated precipitation from chloroform/hexane.

Photoelectrochemical Setup

A standard 3-electrode electrochemical cell was used. Pt wire was used as the counter electrode and a saturated calomel electrode (SCE) was the standard. Potential was scanned from +0.5 V to −0.6 V vs. SCE at a rate of 50–100 millivolts per second.

A Xenon arc lamp was used as the light source which was capable of delivering a light intensity of up to 2.5 watts/cm$^2$ over a small area.

EXAMPLE 1

An electrode of 0.16 cm$^2$ exposed surface modified as above, was placed in the electrochemical cell filled with HBF$_3$OH. In the dark there was no current at potentials between +0.5 to −0.6 V versus SCE. Upon shining light on the face of the electrode, a small current flowed at −0.6 V (∼0.1 mA). In 15 minutes the current increased to 1.5 mA and continued to increase until after 4.5 hours the underpotential was 420 mV and the saturation current was 36 mA at 0.6 V.

The maximum power density gain at 30 mA and −0.5 V versus SCE was 8.6% using light intensity of 870 mW/cm$^2$, at the maximum the underpotential was 400 mV.

This electrode was run continuously for 22 hours with no reduction in current or underpotential.

EXAMPLE 2

Same as Example 1 except Si used had (111) face exposed and resistivity was 1 Ωcm. A thinner polymer film was used.

In the dark, no current flowed. Upon shining light on the electrode, a saturation current at −0.6 V of 1.5 mA was observed. In 10 minutes the current increased to 2 mA. In 1 hour the current at −0.6 V was 5.5 mA and an underpotential of 100 mV was observed. After running overnight, the saturation current was 17 mA and an underpotential of 400 mV was observed.

The electrode was run continuously for 120 hours. The saturation current then was 13.5 mA at −0.6 V. The underpotential was 200 mV.

EXAMPLE 3

Same as Example 1 except that 1 M HBF$_4$ was used as the electrolyte. An underpotential of 250 mV was achieved in 2 hours. The electrode was stable overnight with no loss in the underpotential.

EXAMPLE 4

Same as Example 1 except that 1 M HCl/2 M KCl was used as an electrolyte. An underpotential of 300 mV was achieved overnight.

Since we were not using a divided cell, the electrode began to deteriorate after continuously running for 24 hours, due to the increasing concentration of chlorine gas evolved at the counterelectrode.

EXAMPLE 5

Same as Example 1 except that 1 M HClO$_4$/2 M Na ClO$_4$ was used as an electrolyte. An underpotential of 300 mV was achieved overnight. This electrode did not lose any activity for 30 hours.

When it was exposed to sunlight it gave the same underpotential as when exposed to Xe lamp. When sunlight was focused on it with a hand-held lens, current was increased beyond the instrument's limit.

EXAMPLE 6

A film was formed by plasma polymerizing 1-methyl-12-vinyl-ferrocenophane on the Si surface. The film was 50μ thick. HBF$_3$OH was the electrolyte used.

The electrode achieved an underpotential of 450 mV after three days' exposure. The underpotential was 400 mV a day later.

We claim:

1. A process for generating hydrogen from water containing an acid by passing an electric current through the water using a cathode which is a semiconductor exposed to light, said process characterized in that a transition metal metallocenophane compound is attached to the surface of the cathode by means of a polymer.

2. A process as claimed in claim 1 wherein the light is sunlight.

3. A process as claimed in claim 1 wherein the transition metal is iron, cobalt or ruthenium.

4. A process as claimed in claim 1 wherein the transition metal is iron.

5. A process as claimed in claim 1 wherein the metallocenophane compound is chemically bonded to a polymer which is on the surface of the cathode.

6. A process as claimed in claim 1 wherein the metallocenophane compound is dispersed in a polymer which is on the surface of the cathode.

7. A process as claimed in claim 1 wherein the cathode is p-type silicon.

8. A process as claimed in claim 1 wherein the acid is boron trifluoride hydrate.

9. A process as claimed in claim 1 where the acid is perchloric acid.

10. A process for generating hydrogen from water containing boron trifluoride hydrate by passing an electric current through the water with a p-type silicon semiconductor cathode which is exposed to sunlight and which is coated with a polymer chemically bonded to [1.1]ferrocenophane.

* * * * *